(12) United States Patent
Black

(10) Patent No.: US 11,751,163 B2
(45) Date of Patent: *Sep. 5, 2023

(54) SENDING NOTIFICATIONS TO MOBILE DEVICES OVER PAGING NETWORKS

(71) Applicant: APB Care Systems LLC, Portland, OR (US)

(72) Inventor: Colin F. Black, Portland, OR (US)

(73) Assignee: APB Care Systems LLC, Portland, OR (US)

(*) Notice: Subject to any disclaimer, the term of this patent is extended or adjusted under 35 U.S.C. 154(b) by 77 days.

This patent is subject to a terminal disclaimer.

(21) Appl. No.: 17/484,862

(22) Filed: Sep. 24, 2021

(65) Prior Publication Data

US 2022/0086795 A1 Mar. 17, 2022

Related U.S. Application Data

(63) Continuation of application No. 16/420,060, filed on May 22, 2019, now Pat. No. 11,134,466.

(60) Provisional application No. 62/675,077, filed on May 22, 2018.

(51) Int. Cl.
*H04W 68/00* (2009.01)
*H04W 4/80* (2018.01)
*H04W 80/06* (2009.01)
*H04W 60/00* (2009.01)
*H04L 67/12* (2022.01)

(52) U.S. Cl.
CPC .......... *H04W 68/005* (2013.01); *H04W 4/80* (2018.02); *H04W 60/00* (2013.01); *H04W 80/06* (2013.01); *H04L 67/12* (2013.01)

(58) Field of Classification Search
CPC ..... H04W 68/005; H04W 4/80; H04W 60/00; H04W 80/06; H04W 4/90; H04W 84/022; H04L 67/12; H04L 67/55
See application file for complete search history.

(56) References Cited

U.S. PATENT DOCUMENTS 6,188,907 B1 * 2/2001 Reding ................ H04M 11/022
455/515
6,477,117 B1 * 11/2002 Narayanaswami .... G04G 21/04
368/251
8,510,409 B1 * 8/2013 Harris ................... H04L 69/162
709/228

(Continued)

FOREIGN PATENT DOCUMENTS

WO 2017210670 A1 12/2017
WO 2019226834 A1 11/2019

OTHER PUBLICATIONS

International Searching Authority, International Search Report and Written Opinion dated Aug. 6, 2019 for PCT/US2019/033622, 10 pages.

*Primary Examiner* — John D Blanton
(74) *Attorney, Agent, or Firm* — Perkins Coie LLP

(57) ABSTRACT

A method for confirming receipt of a redundant notification by a wireless device includes transmitting redundant notifications to the wireless device via different types of networks (e.g., a paging network). A notification is configured to cause the mobile device to wake-up a mobile application that opens a real-time communications session between the mobile device and the server and generates an indication that the mobile device received at least one of the redundant notifications.

20 Claims, 3 Drawing Sheets

(56) References Cited

U.S. PATENT DOCUMENTS

| | | | |
|---|---|---|---|
| 2005/0148890 A1* | 7/2005 | Hastings | G16H 40/67 |
| | | | 600/509 |
| 2008/0306759 A1 | 12/2008 | Ilkin et al. | |
| 2011/0001605 A1* | 1/2011 | Kiani | G16H 40/67 |
| | | | 235/492 |
| 2012/0016305 A1 | 1/2012 | Jollota et al. | |
| 2013/0282873 A1 | 10/2013 | Payne et al. | |
| 2015/0222756 A1* | 8/2015 | Tsaliah | H04M 11/022 |
| | | | 455/404.2 |
| 2017/0072199 A1* | 3/2017 | Biele | A61N 1/0553 |
| 2018/0069959 A1* | 3/2018 | Ursini | H04W 76/50 |
| 2019/0230623 A1* | 7/2019 | Okajima | H04W 68/02 |

\* cited by examiner

_US 11,751,163 B2_

SENDING NOTIFICATIONS TO MOBILE DEVICES OVER PAGING NETWORKS

This application is a continuation of U.S. patent application Ser. No. 16/420,060, filed May 22, 2019, entitled "SENDING NOTIFICATIONS TO MOBILE DEVICE OVER PAGING NETWORKS," which claims priority to U.S. Provisional Patent Application No. 62/675,077, filed on May 22, 2018, entitled "SENDING NOTIFICATIONS TO MOBILE DEVICE OVER PAGING NETWORKS, both of which are hereby incorporated by reference in their entireties.

BACKGROUND

Certain mobile device operating systems (e.g., iOS) prevent, or may prevent, use of "VoIP background sockets," or other background connection mechanisms. These sockets or mechanisms enable a mobile application to maintain connection to a remote server when the application is in the background (e.g., while the device is off and in a pocket of the user, while another application is being used, and so on) of the operating system. For example, the application may receive messages from the server via the connection, even while the application is not actively being used. In preventing these background connections, an OS may prevent applications in the background from utilizing battery power when maintaining persistent connections to associated servers.

There are some functions, such as VoIP (Voice over Internet Protocol) push notifications or high priority messages sent via Apple's cloud-based APNS (Apple Push Notifications Service), intended to be received by the device, which seek to provide devices with notifications or other messages. However, such notifications/messages may not reach a device until there is Internet or other wireless connectivity, and they often reach a device later than notifications received via background sockets. Therefore, due to limitations in these operating systems, among other things, it can be problematic to rely on a mobile device to consistently and reliably receive and present notifications, such as alerts, to associated users.

Thus, there are various drawbacks associated with certain approaches (e.g., background sockets and/or push notifications) provided by the different OS environments (e.g., iOS or Android) to notifying a mobile application with an alert, message, or other information.

DETAILED DESCRIPTION

Figure 1:
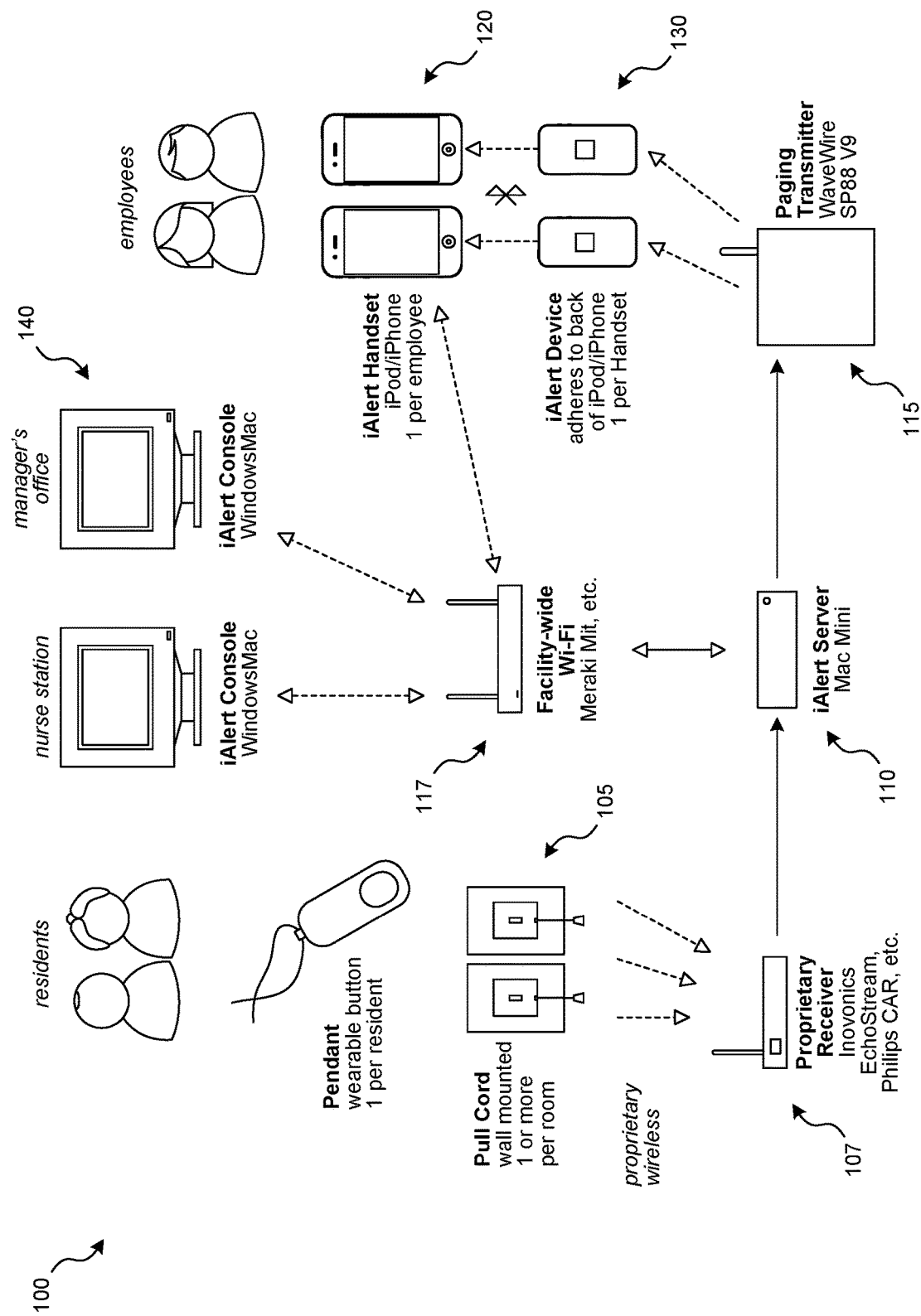
FIG. 1 illustrates aspects of a suitable network environment that provides notifications to mobile devices.

Systems and methods are described herein for providing a robust, fast, and reliable notification system via mobile applications on mobile devices. The systems and methods utilize a combination of a paging network and a local device communication channel (e.g., Bluetooth) or personal area network to provide messages, alerts, triggers, and other notifications to a device that originate from a server.

In some embodiments, a device attachment (e.g., in some cases, named rAlert™) or interface device, such as a peripheral that adheres to the back of a mobile device, enables the mobile device to receive alerts originating from a radio transmitter (e.g., alerts transmitted over radio frequencies that alphanumeric pagers utilize with high levels of reliability). For example, when a location or facility already has a qualified alphanumeric pager transmitter available (e.g., a hospital, nursing, or other medical facility), a notification server associated with the device peripheral may communicate via the facility's notification network to send alerts.

The device attachment, which may act as a Bluetooth or other short area communications peripheral, provides an interface between the paging network and the mobile device. For example, the device attachment may include Bluetooth components and central processing components on a main chip of the device attachment, and RF (to receive UHF pager signals) on another chip of the device attachment.

The notification system (e.g., the device attachment and/or associated server), therefore, enables a mobile device to receive messages from the server with the speed and reliability of alphanumeric pagers, while also acting as a redundancy against Wi-Fi or Internet connection failures at the facility. In some cases, for example, the notification system may listen to both channels simultaneously (e.g., an OS based notification channel and the paging network notification channel) and filter out any redundant messages as they are received before alerting a user of the recipient mobile device (e.g., via an associated mobile application).

The following description provides specific details for a thorough understanding of, and enabling description for, various embodiments of the technology. One skilled in the art will understand that the technology may be practiced without these details. In some instances, well-known structures and functions have not been shown or described in detail to avoid unnecessarily obscuring the description of the embodiments of the technology. It is intended that the terminology used in the description presented below be interpreted in its broadest reasonable manner, even though it is being used in conjunction with a detailed description of certain embodiments of the technology. Although certain terms may be emphasized below, any terminology intended to be interpreted in any restricted manner will be overtly and specifically defined as such in this Detailed Description section.

Examples of a Suitable Network Environment

FIG. 1 illustrates aspects of a network environment 100 configured to transmit notifications (e.g., alerts, announcements, messages, communications, and so on) within a facility or location. For example, the network environment 100 depicts use of the notification system described herein within an emergency services facility, such as a medical facility.

For example, the notification system can be associated with a nurse call system intended for deployment in senior living facilities and other care centers or locations (e.g., homes). The basic purpose of a nurse call system is to allow the residents of a facility to call the employees for assistance. The system enables the employee (the nurse or caregiver) to receive alerts via their mobile device as they would via a pager, even when their mobile device is not in active use.

Further, an associated mobile application, which can present received alerts or other notifications to the user, provides, in some cases, a real-time view into the activity within the facility. For example, the employee can assume responsibility for particular calls or alerts and keep in touch with their colleagues via group or direct messaging features. Also, the system can provide, via associated consoles, various analytics features that provide managers with comprehensive views into the operations and activities within the facility.

Of course, other facilities or uses may employ some or all aspect of the notification system. Examples include public facilities and emergency response systems, school or university campuses, and other locations or scenarios that benefit from an enhanced speed and/or reliability of its notification system.

As described herein, the notification system is implemented to manage communications that begin within a pager network or other radiofrequency network implemented at a facility, and end at various mobile devices, such as smartphones, tablets, and so on.

A resident, patient, or employee at the facility may initiate a notification via a patient device 105, such as a pendant or wearable device, or a pull-cord device located within various rooms of the facility. Other similar devices can initiate alerts or indications of activity to be attended to, including door or window sensors, temperature sensors, equipment monitors, and so on. For example, when a resident requests assistance from a nurse, they push a button on the wearable device, which sends an initial communication to an associated receiver over a network or protocol (e.g., Inovonics, EchoStream, and so on) specific to the type of patient device 105.

The receiver 107 transmits a message or other communication to a notification server 110 (or, to multiple servers) of the facility configured to send notifications (e.g., alerts or other urgent or timely messages) to people within the facility. The notification server 110 includes components that transmit notifications over multiple different networks, including a radiofrequency network (e.g., a pager network), and various wireless networks. For example, the notification server 110 can send a first message to a paging transmitter 115 for transmission over a pager network, and a second message to a Wi-Fi transmitter 117 for transmission over a wireless network. Thus, in some embodiments, the notification server 110 acts as a central server component of the notification system, managing notifications and other data between components within the facility.

The paging transmitter 115, upon receiving notifications from the notification server 110, transmits pager messages associated with the notifications over a pager network or other radiofrequency network, such as a network that supports an asynchronous paging protocol. Example network protocols include a POCSAG (post office code standardisation advisory group) protocol, a FLEX protocol, and/or a reFLEX protocol, for transmitting data to paging devices.

As described herein, a handset or mobile device 120, including a mobile application (e.g., iOS application) is carried by employees of the facility. The mobile device 120, which can be smartphone, tablet, laptop, or other similar device, receives notifications sent via the wireless network or the pager network.

To receive notifications sent over the pager network (via the paging network 115), the mobile device 120 is associated with a notification device 130 (e.g., rAlert™ device), which, as described herein, is a wireless attachment or Bluetooth peripheral that can adhere or attach to the mobile device 120 (or otherwise is connected or associated with the device).

The notification device 130 acts as an interface device between the pager network and the mobile device 120, enabling the mobile device to receive notifications initiated via the pager network (and thus act as or be considered a pager), providing high reliability and redundancy for receiving alerts and messages, among other benefits, within the facility. In some embodiments, the notification device 130, or interface device, may expose or advertise itself as a Bluetooth LE peripheral for the purpose of re-transmitting received pager messages (e.g., POCSAG messages from the server 110 via the paging transmitter 115) to a nearby paired Bluetooth device, such as the mobile device 120. Further details regarding the notification device 130 are described herein.

The notification server 110 can also send notifications to a console device 140, which can include a desktop computer application that provides employees at nurse stations and facility managers a full real-time status of open calls and actions within a facility. The console device 140, in some cases, present a dashboard of activity and calls, reports associated with open or completed calls or notifications, and so on.

Of course, the network environment 100 can include other components, such as Wi-Fi routers and other communication network components.

FIG. 1 and the discussion herein provide a brief, general description of a suitable computing environment 100 in which the systems and methods can be supported and implemented. Although not required, aspects of the systems and methods are described in the general context of computer-executable instructions, such as routines executed by a general-purpose computer, e.g., mobile device, a server computer, or personal computer. Those skilled in the relevant art will appreciate that the system can be practiced with other communications, data processing, or computer system configurations, including: Internet appliances, handheld devices (including tablet computers and/or personal digital assistants (PDAs)), all manner of cellular or mobile phones, multi-processor systems, microprocessor-based or programmable consumer electronics, set-top boxes, network PCs, mini-computers, mainframe computers, and the like. Indeed, the terms "computer," "host," and "host computer," and "mobile device" and "handset" are generally used interchangeably herein, and refer to any of the above devices and systems, as well as any data processor.

Aspects of the system can be embodied in a special purpose computing device or data processor that is specifically programmed, configured, or constructed to perform one or more of the computer-executable instructions explained in detail herein. Aspects of the system may also be practiced in distributed computing environments where tasks or modules are performed by remote processing devices, which are linked through a communications network, such as a Local Area Network (LAN), Wide Area Network (WAN), or the Internet. In a distributed computing environment, program modules may be located in both local and remote memory storage devices.

Aspects of the system may be stored or distributed on computer-readable media (e.g., physical and/or tangible non-transitory computer-readable storage media), including magnetically or optically readable computer discs, hard-wired or preprogrammed chips (e.g., EEPROM semiconductor chips), nanotechnology memory, or other data storage media. Indeed, computer implemented instructions, data structures, screen displays, and other data under aspects of the system may be distributed over the Internet or over other networks (including wireless networks), on a propagated signal on a propagation medium (e.g., an electromagnetic wave(s), a sound wave, etc.) over a period of time, or they may be provided on any analog or digital network (packet switched, circuit switched, or other scheme). Those skilled in the relevant art will recognize that portions of the system reside on a server computer, while corresponding portions reside on a client computer such as a mobile or portable device, and thus, while certain hardware platforms are described herein, aspects of the system are equally applicable to nodes on a network. In an alternative embodiment, the mobile device or portable device may represent the server portion, while the server may represent the client portion.

In some embodiments, the mobile device 120 may include network communication components that enable the mobile device 120 to communicate with remote servers or other portable electronic devices by transmitting and receiving wireless signals using a licensed, semi-licensed, or unlicensed spectrum over a communications network. In some cases, the communication network may be comprised of multiple networks, even multiple heterogeneous networks, such as one or more border networks, voice networks, broadband networks, service provider networks, Internet Service Provider (ISP) networks, and/or Public Switched Telephone Networks (PSTNs), interconnected via gateways operable to facilitate communications between and among the various networks. As described herein, the communications network may also include third-party communications networks such as a Global System for Mobile (GSM) mobile communications network, a code/time division multiple access (CDMA/TDMA) mobile communications network, a 3rd or 4th generation (3G/4G) mobile communications network (e.g., General Packet Radio Service (GPRS/EGPRS)), a 5G network, Enhanced Data rates for GSM Evolution (EDGE), Universal Mobile Telecommunications System (UMTS), Long Term Evolution (LTE) network), Voice over LTE (VoLTE), IMS network, or other communications network.

Examples of the Notification System

As described herein, the notification system, in some embodiments, enables a mobile device to receive alerts, messages, and other notifications originally sent to an associated user via a pager network or other radiofrequency network.

Figure 2:
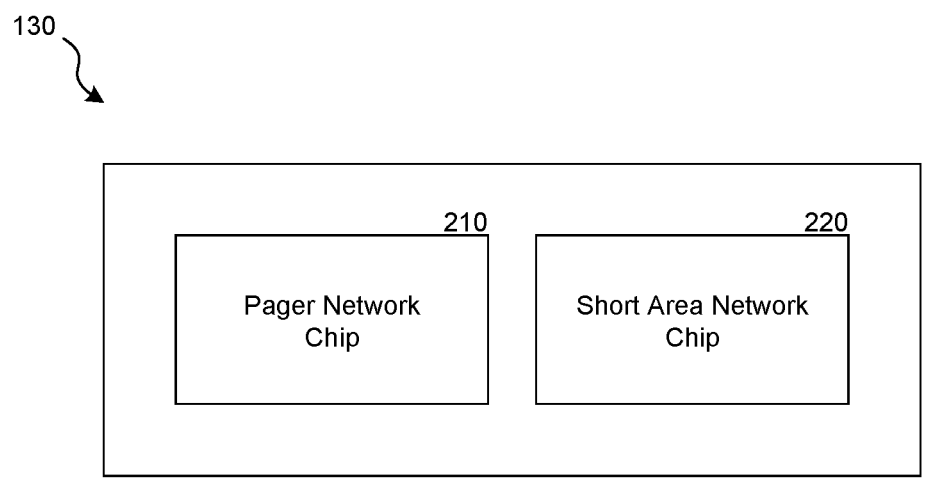
FIG. 2 is a block diagram illustrating a notification device for a mobile device.

FIG. 2 is a block diagram illustrating an example notification device 130. The notification device 130, in some cases, acts as an interface device or intermediary between a pager network and a mobile device that receives notifications originating from the pager network.

As described herein, the notification device 130, or interface device, may expose or advertise itself as a Bluetooth LE peripheral or other short area communications peripheral in order to re-transmit or re-direct received pager messages to a paired mobile device, such as mobile device 120.

The notification device 130 includes a pager network chip 210 configured to receive a notification from a server over a paging network protocol. The pager network chip 210 can be a chip capable of receiving pager messages via one or more asynchronous paging protocols, such as the POCSAG (post office code standardisation advisory group) protocol, the FLEX protocol, the reFLEX protocol, or other protocols that facilitate one-way or two-way transmission of data to paging devices. Thus, the pager network chip 210, in some embodiments, causes the notification device 130 to operate as a pager or similar device with pager functionality.

The notification device 130 also includes a short area network chip 220 configured to transmit the notification to the mobile application of the mobile device over a short area communication channel. In some cases, the short area network chip 220 is a Bluetooth communication chip, such as the Cypress ProC™ MCU chip. Of course, in some embodiments, the various functions described herein may be integrated as one chip or hardware component, with various software modules implemented in memory and utilized to perform the methods described herein.

Figure 3:
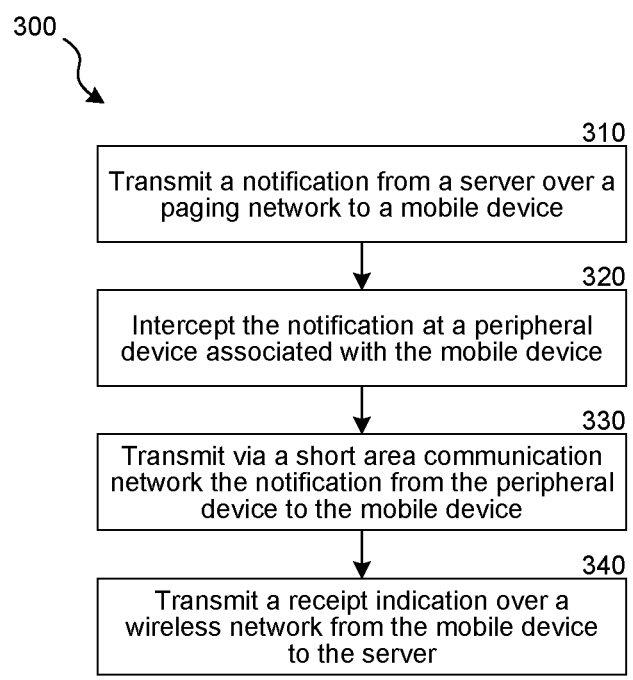
FIG. 3 is a flow diagram illustrating a method of sending a notification to a mobile device.

Thus, as described herein, the notification device 130 pairs with the mobile device 120, and operates to re-direct notifications received via a pager network to a wireless network from which the mobile device (via various mobile applications) is capable of receiving messages and other communications. FIG. 3 is a flow diagram illustrating a method 300 of sending a notification to a mobile device. The method 300 may be performed by the notification system, and, accordingly, is described herein merely by way of reference thereto. It will be appreciated that the method 300 may be performed on any suitable hardware.

In operation 310, the notification system transmits a notification over a paging network to the mobile device. For example, the notification server 110 may send the notification via the paging transmitter 115, which sends the notification over a paging protocol to the notification device 130.

In operation 320, the notification system intercepts the notification at an interface device associated with the mobile device. For example, the notification device 130, which acts as an interface between the paging network and the mobile device 120, intercepts the notification. As described herein, the notification device 130, in some embodiments, includes a module or component (e.g., a chip or circuitry) configured to receive a notification from a server over a paging network protocol and a module or component (e.g., a chip or circuitry) configured to transmit or direct the notification to the mobile application of the mobile device over a Bluetooth communication channel (or other short area communication channel).

In operation 330, the system transmits over a short area communications channel the notification to the mobile device. For example, the notification device 130 may be a Bluetooth peripheral paired to the mobile device 120 that transmits the notification to a mobile application over an established Bluetooth communication channel.

In some cases, once the mobile application receives the notification, it opens a two-way communication with the notification server to establish a chat or other real-time communications session. For example, the mobile application may then utilize APNS (Apple Push Notification service) in iOS based mobile devices to facilitate communications between the mobile device and various components of the system 100. In such cases, upon receiving a notification, the mobile application can an open a two-way communication with the server 110 via a TCP/IP socket connection or make calls against HTTP/S RESTful or other standards-based or proprietary APIs.

In operation 340, the system transmits a receipt indication via a wireless network or other IP communication protocol to the notification server 110. For example, because the APNS does not issue receipts back, the notification server 110 may not be aware that notifications were received by the mobile device 120 or brought to the attention of the user. Thus, when the notification device 130 transmits a notification via Bluetooth (BLE) to the mobile device 120, the OS of the device wakes up the mobile application, which can open up a TCP/IP connection back to the server 110 or call an API associated with the server 110 and inform the server 110 that the notification had been successfully received by the mobile device 120.

Further, after a certain period of time where the mobile device 120 has not sent a receipt for a particular notification it should have received, the notification system, via the notification server 110, may a) re-dispatch the notification automatically until a receipt is received, and/or b) notify other mobile devices or actors (such the desktop computers 140 running console software) that the mobile device 120 has not received its notification (or a certain number of notifications, or for some period of time, and so on). In such cases, the system performs additional actions, such as contacting other mobile devices, when a target mobile device is unresponsive or unavailable.

In order to mitigate such issues, the notification device 130 can wake up the mobile application periodically, prompting the mobile device 120 to notify the server 110 (over TCP or REST API service) that the device is active and capable of receiving notifications, enabling the notification system to reliably send notifications to the mobile device when it is in use and not offline. Thus, the mobile application can schedule future activations of the application and transmit the schedule to the notification device 130 (via one or more APIs in firmware of the device, enabling the notification device 130 to activate the application at schedules times.

In some cases, by avoiding use of a wireless network for the notifications, any communications are self-contained within the facility and between parties, as all communications are over short area networks (e.g., Bluetooth mesh networks) that do not utilize the Internet or cloud components. In certain scenarios, such as medical or care scenarios, the self-containment of messaging or communications may enable the system to comply with various regulations (e.g., HIPPA, COPPA, and so on).

Further, such a communications system can enable more reliable messaging and other communications in areas or locations that suffer from poor wireless connectivity, such as basement or below ground facilities, facilities with certain building characteristics, and so on. Transmitting notifications over RF and short area networks enables the system to maintain reliable communications within such locations, again avoid wireless networks that suffer from reliability and speed issues in certain environments.

Thus, in some embodiments, the notification system provides a notification to a mobile device application by receiving, at an interface device (e.g., device 130) associated with the mobile device, a notification from a server over a radiofrequency communications network, and transmitting the notification from the interface device to the mobile device over a short area communications channel.

As described herein, the system and/or various aspects of the system may operate in various scenarios, locations, or facilities, including medical care facilities, long term care facilities, emergency scenarios (e.g., emergency response scenarios), breaking news or alert scenarios, and any situation, scenario and/or environment where speed and reliability (via redundancy) is expected and/or beneficial.

CONCLUSION

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof, means any connection or coupling, either direct or indirect, between two or more elements; the coupling of connection between the elements can be physical, logical, or a combination thereof. Additionally, the words "herein," "above," "below," and words of similar import, when used in this application, shall refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

The above detailed description of embodiments of the system is not intended to be exhaustive or to limit the system to the precise form disclosed above. While specific embodiments of, and examples for, the system are described above for illustrative purposes, various equivalent modifications are possible within the scope of the system, as those skilled in the relevant art will recognize. For example, some network elements are described herein as performing certain functions. Those functions could be performed by other elements in the same or differing networks, which could reduce the number of network elements. Alternatively or additionally, network elements performing those functions could be replaced by two or more elements to perform portions of those functions. In addition, while processes, message/data flows, or blocks are presented in a given order, alternative embodiments may perform routines having steps, or employ systems having blocks, in a different order, and some processes or blocks may be deleted, moved, added, subdivided, combined, and/or modified to provide alternative or subcombinations. Each of these processes, message/data flows, or blocks may be implemented in a variety of different ways. Also, while processes or blocks are at times shown as being performed in series, these processes or blocks may instead be performed in parallel, or may be performed at different times. Further any specific numbers noted herein are only examples: alternative implementations may employ differing values or ranges. Those skilled in the art will also appreciate that the actual implementation of a database may take a variety of forms, and the term "database" is used herein in the generic sense to refer to any data structure that allows data to be stored and accessed, such as tables, linked lists, arrays, etc.

The teachings of the methods and system provided herein can be applied to other systems, not necessarily the system described above. The elements and acts of the various embodiments described above can be combined to provide further embodiments.

Any patents and applications and other references noted above, including any that may be listed in accompanying filing papers, are incorporated herein by reference. Aspects of the technology can be modified, if necessary, to employ the systems, functions, and concepts of the various references described above to provide yet further embodiments of the technology.

These and other changes can be made to the invention in light of the above Detailed Description. While the above description describes certain embodiments of the technology, and describes the best mode contemplated, no matter how detailed the above appears in text, the invention can be practiced in many ways. Details of the system may vary considerably in its implementation details, while still being encompassed by the technology disclosed herein. As noted above, particular terminology used when describing certain features or aspects of the technology should not be taken to imply that the terminology is being redefined herein to be restricted to any specific characteristics, features, or aspects of the technology with which that terminology is associated. In general, the terms used in the following claims should not be construed to limit the invention to the specific embodiments disclosed in the specification, unless the above Detailed Description section explicitly defines such terms. Accordingly, the actual scope of the invention encompasses not only the disclosed embodiments, but also all equivalent ways of practicing or implementing the invention under the claims.

While certain aspects of the technology are presented below in certain claim forms, the inventors contemplate the various aspects of the technology in any number of claim forms. For example, while only one aspect of the invention is recited as embodied in a computer-readable medium, other aspects may likewise be embodied in a computer-readable medium. Accordingly, the inventors reserve the right to add additional claims after filing the application to pursue such additional claim forms for other aspects of the technology.

What is claimed is:

1. A computer-readable storage medium, excluding transitory signals and carrying instructions, which, when executed by at least one data processor of a system, cause the system to:
    transmit, via a wireless network, a first notification addressed for a mobile device;
    transmit, via a paging network other than the wireless network, a second notification addressed for the mobile device,
        wherein the second notification is redundant of the first notification, and
        wherein the second notification is configured to cause the mobile device to wake-up a mobile application on the mobile device that opens a real-time communications session between the mobile device and the system and generates an indication that the mobile device received the first notification or the second notification; and
    receive, via the real-time communications session, a message including the indication that the mobile device received the first notification or the second notification.

2. The computer-readable storage medium of claim 1, wherein the first notification and the second notification are simultaneously transmitted by the system for the mobile device.

3. The computer-readable storage medium of claim 1, wherein the system is caused to, prior to the first notification being transmitted for the mobile device:
    receive an alert notification generated by a wireless device of a user at a medical facility; and
    in response to the alert notification being received, transmit the first notification or the second notification to the mobile device.

4. The computer-readable storage medium of claim 1, wherein the paging network is configured to transmit notifications in pager messages in accordance with an asynchronous paging protocol.

5. The computer-readable storage medium of claim 1, wherein the paging network is configured to utilize a POCSAG (post office code standardization advisory group) protocol, a FLEX protocol, or a reFLEX protocol to transmit messages to paging devices.

6. The computer-readable storage medium of claim 2:
    wherein the first notification is communicated to the mobile device via a Wi-Fi network, and
    wherein the second notification is communicated via the paging network to an intermediary device and then routed to the mobile device via a Bluetooth network.

7. The computer-readable storage medium of claim 1, wherein to transmit the second notification via the paging network comprises causing the system to:
    transmit the second notification in a pager message via the paging network to an intermediate device configured to redirect the second notification to the mobile device via a short-radio network.

8. The computer-readable storage medium of claim 1, wherein the system includes a server of a medical facility configured to broadcast the first and second notifications to multiple mobile devices of personnel of the medical facility.

9. A server configured to transmit redundant notifications on different types of networks to mobile devices, the server comprising:
    at least one network interface;
    at least one hardware processor; and
    at least one non-transitory memory storing instructions, which, when executed by the at least one hardware processor, cause the server to:
        transmit, through the at least one network interface, and via two different types of networks, redundant notifications addressed for a mobile device,
            wherein the two different types of networks include a paging network configured to utilize an asynchronous paging protocol to communicate pager messages, and
            wherein one of the redundant notifications is configured to cause a mobile application of the mobile device to wake-up and open a real-time communications session between the mobile device and the server;
        connect, through the at least one network interface, to the mobile device via the real-time communications session; and
        receive, via the real-time communications session through the at least one network interface, a message from the mobile application indicating that the mobile device has received any of the redundant messages.

10. The server of claim 9:
    wherein a first notification is transmitted directly to the mobile device via a wireless network, and
    wherein a second notification is transmitted indirectly to the mobile device via the paging network other than the wireless network, the second notification being redundant of the first notification.

11. The server of claim 10, wherein the first notification and the second notification are transmitted simultaneously from the server for the mobile device.

12. The server of claim 10, wherein the server is caused to, prior to the first notification being transmitted to the mobile device:
    receive an alert notification generated by a wireless device at a medical facility; and
    in response to the alert notification being received, transmit the first notification or the second notification to the mobile device.

13. The server of claim 9, wherein the server is caused to;
    connect to the mobile device via the real-time communications session; and
    receive, via the real-time communications session, an indication from the mobile application on the mobile device that at least one of the redundant notifications has been received by the mobile device.

14. The server of claim 9, wherein the server is configured to broadcast redundant notifications to multiple mobile devices of personnel of a medical facility.

15. The server of claim 9, wherein the real-time communications session is a TCP/IP session that enables two-way communication between the server and the mobile device.

16. A method performed by a wireless device for confirming receipt of a notification, the method comprising:
    receiving, from a server via a first wireless network, a first notification addressed for the wireless device; and
    receiving, from the server via a second wireless network, a second notification addressed for the wireless device,
        wherein the first wireless network and the second wireless network are of different types, and
        wherein the second notification is redundant of the first notification;
    in response to the first notification or the second notification:
        causing a mobile application on the wireless device to open a communications socket to the server;
        calling, via the communications socket, an application programming interface (API) to indicate to the server that the first notification or the second notification was received by the mobile application; and
        transmitting a message to the server including the indication that the wireless device received the first notification or the second notification.

17. The method of claim 16 further comprising:
    causing the mobile application to present information associated with the first notification on the wireless device upon receipt of the first notification by the wireless device.

18. The method of claim 16, wherein the first wireless network is a paging network configured to transmit notifications for wireless devices in pager messages via an asynchronous paging protocol.

19. The method of claim 16, wherein the first notification and the second notification are transmitted simultaneously from the server for the wireless device.

20. The method of claim 16:
    wherein the first notification is sent by the server via the first wireless network,
    wherein the first notification is received by the wireless device via a third wireless network, and
    wherein the third wireless network is a short-range wireless network.

* * * * *